US012590725B2

(12) United States Patent
    Lee et al.

(10) Patent No.: US 12,590,725 B2
(45) Date of Patent: Mar. 31, 2026

(54) ELECTRONIC DEVICE AND METHOD OF CONTROLLING AMBIENT TEMPERATURE USING THE SAME

(71) Applicant: SAMSUNG ELECTRONICS CO., LTD., Suwon-si (KR)

(72) Inventors: So Young Lee, Suwon-si (KR); Sung Ho Kim, Suwon-si (KR); Bok Soon Kwon, Suwon-si (KR); Sang Kyu Kim, Suwon-si (KR); Ho Taik Lee, Suwon-si (KR); Hong Soon Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 18/086,281

(22) Filed: Dec. 21, 2022

(65) Prior Publication Data

US 2023/0408124 A1    Dec. 21, 2023

(30) Foreign Application Priority Data

Jun. 17, 2022    (KR) ........................ 10-2022-0073992

(51) Int. Cl.
    *F24F 11/58*       (2018.01)
    *F24F 120/00*      (2018.01)
    *G01K 13/20*       (2021.01)

(52) U.S. Cl.
    CPC .............. *F24F 11/58* (2018.01); *G01K 13/20* (2021.01); *F24F 2120/00* (2018.01); *G01K 2201/00* (2013.01)

(58) Field of Classification Search
    CPC ...... F24F 11/58; F24F 2120/00; G01K 1/165; G01K 13/20; G01K 17/00; G01K 2201/00; G01K 7/427
    See application file for complete search history.

(56) References Cited

U.S. PATENT DOCUMENTS

| | | | |
|---|---|---|---|
| 7,249,883 B2 | 7/2007 | Kuroda et al. | |
| 7,260,950 B2 | 8/2007 | Choi et al. | |
| 7,299,090 B2 | 11/2007 | Koch | |
| 9,357,929 B2 | 6/2016 | Paquet | |
| 9,909,774 B2 * | 3/2018 | Cheatham, III | ......... F24F 11/62 |
| 10,266,033 B2 | 4/2019 | Yoneda et al. | |
| 10,368,811 B1 | 8/2019 | Bajaj et al. | |
| 10,486,491 B2 | 11/2019 | Yoneda et al. | |
| 10,765,409 B2 | 9/2020 | Lafon et al. | |
| 10,843,525 B2 | 11/2020 | Yoneda et al. | |

(Continued)

FOREIGN PATENT DOCUMENTS

| | | |
|---|---|---|
| JP | 5898204 B2 | 4/2016 |
| JP | 6648720 B2 | 2/2020 |

(Continued)

*Primary Examiner* — Tameem D Siddiquee
(74) *Attorney, Agent, or Firm* — Sughrue Mion, PLLC

(57)    ABSTRACT

An electronic device may include: a first temperature sensor configured to measure a first temperature of body skin; a second temperature sensor configured to measure a second temperature at a position spaced apart from the body skin; and a processor configured to estimate skin heat loss based on the first temperature and the second temperature, and to determine a target ambient temperature for controlling an ambient temperature based on the first temperature and the skin heat loss.

17 Claims, 18 Drawing Sheets

(56) References Cited

U.S. PATENT DOCUMENTS

| | | | |
|---|---|---|---|
| 11,109,764 B2 | 9/2021 | Bongers et al. | |
| 11,141,090 B2 | 10/2021 | Shikii et al. | |
| 11,224,344 B2 | 1/2022 | Ellis et al. | |
| 11,248,820 B2 | 2/2022 | Wang et al. | |
| 2008/0077044 A1 | 3/2008 | Nakayama et al. | |
| 2011/0264001 A1* | 10/2011 | Cheung | G01K 7/21 |
| | | | 600/549 |
| 2012/0238901 A1* | 9/2012 | Augustine | A61B 5/01 |
| | | | 600/549 |
| 2017/0095670 A1* | 4/2017 | Ghaffari | A61M 21/02 |
| 2017/0296378 A1* | 10/2017 | Schaefer | G05B 15/02 |
| 2018/0242850 A1* | 8/2018 | Ellis | A61B 5/02007 |
| 2019/0053713 A1 | 2/2019 | DeBates et al. | |
| 2019/0193514 A1* | 6/2019 | Yoneda | G01J 5/026 |
| 2019/0350462 A1 | 11/2019 | Bierderman et al. | |
| 2020/0180396 A1 | 6/2020 | Youn et al. | |
| 2021/0039471 A1 | 2/2021 | Nakashima et al. | |
| 2021/0123819 A1 | 4/2021 | Seyama et al. | |
| 2021/0399186 A1 | 12/2021 | Warren et al. | |
| 2022/0131493 A1 | 4/2022 | Takahashi et al. | |

FOREIGN PATENT DOCUMENTS

| | | | |
|---|---|---|---|
| JP | 2020-115073 A | 7/2020 | |
| KR | 101148702 B1 | 5/2012 | |
| WO | 2021/005873 A1 | 1/2021 | |

* cited by examiner

1100

1110

1202

1205

1100

10:00
SETTING
TEMPERATURE
23°C

1204

1201

1203

ELECTRONIC DEVICE AND METHOD OF CONTROLLING AMBIENT TEMPERATURE USING THE SAME

CROSS-REFERENCE TO RELATED APPLICATION(S)

This application claims priority from Korean Patent Application No. 10-2022-0073992, filed on Jun. 17, 2022, in the Korean Intellectual Property Office, the disclosure of which is incorporated herein by reference in its entirety.

BACKGROUND

1. Field

Apparatuses and methods consistent with example embodiments relate to controlling external ambient temperature using an electronic device.

2. Description of the Related Art

Human body skin temperature changes due to the effect of ambient temperature. When the internal body heat is generated by long-term exposure to low or high temperature or excessive workload, our body temperature falls outside a specific range, which may put our life in danger. For this reason, our body regulates the body temperature by physiological thermoregulation. Our body maintains a balance of body heat in such a manner that in cold weather, our body shivers and the capillary vessels contract to prevent heat loss from the blood to the skin, and in hot weather, the capillary vessels dilate to release heat from the blood through the skin by sweating and the like. The human body releases heat to the outside by radiation, convection, conduction, evaporation, respiration, and the like. In addition to the physiological thermoregulation, the body temperature may be maintained by using clothing and home appliances (air-conditioner, fan heater, heater, etc.).

SUMMARY

According to an aspect of the present disclosure, there is provided an electronic device including: a first temperature sensor configured to measure a first temperature of body skin; a second temperature sensor configured to measure a second temperature at a position spaced apart from the body skin; and at least one processor configured to: estimate a skin heat loss based on the first temperature and the second temperature, and determine a target ambient temperature based on the first temperature and the skin heat loss.

At least one of the first temperature sensor and the second temperature sensor may be a thermistor.

The at least one processor may be further configured to: calculate skin heat flux by subtracting the second temperature from the first temperature; and estimate the skin heat loss based on the skin heat flux.

The at least one processor may be further configured to predict the target ambient temperature by inputting the first temperature and the skin heat loss to a predefined target ambient temperature prediction model.

The at least one processor may be further configured to compare the predicted target ambient temperature with a current ambient temperature, and control the target ambient temperature based on a result of comparing the predicted target ambient temperature with the current ambient temperature.

The at least one processor may be further configured to: estimate a thermal sensation score of a user by inputting the first temperature and the skin heat loss to a thermal sensation score estimation model; and determine the target ambient temperature based on the estimated thermal sensation score.

In response to the thermal sensation score being lower than a target score, the at least one processor may be further configured to increase the target ambient temperature, and in response to the thermal sensation score exceeding the target score, the at least one processor may be further configured to decrease the target ambient temperature.

The at least one processor may be further configured to: calculate a difference between the thermal sensation score and the target score, and determine an increase or decrease in the target ambient temperature in proportion to the calculated difference.

The at least one processor may be further configured to control a target temperature of an external device according to the target ambient temperature.

The first temperature sensor and the second temperature sensor may be configured to continuously estimate the first temperature and the second temperature, respectively. Based on the continuously estimated first temperature and the continuously estimated second temperature, the at least one processor may be further configured repeatedly control an external device until a current ambient temperature reaches the target ambient temperature.

The electronic device may include a display configure to output at least one of the first temperature, the second temperature, a heat flux, the skin heat loss, a thermal sensation score of a user, the target ambient temperature, and a current ambient temperature.

The electronic device may further include a communication interface configured to transmit a control signal for controlling the target temperature of an external device, and to receive the current ambient temperature from the external device.

The electronic device may further include: a communication interface configured to transmit the target ambient temperature to an external device to enable the external device to adjust an ambient temperature based on the target ambient temperature.

The at least one processor may be further configured to: determine a thermal sensation score of a user based on the first temperature and the skin heat loss; and determine the target ambient temperature based on the thermal sensation score corresponding to the first temperature and the skin heat loss.

The electronic device may further include: a driver configured to control an ambient temperature according to the target ambient temperature.

According to another aspect of the present disclosure, there is provided an electronic device including: a temperature sensor configured to measure a body skin temperature; a heat flux sensor configured to measure a skin heat flux; and at least one processor configured to: estimate skin heat loss based on the skin heat flux, determine a target ambient temperature based on the body skin temperature and the skin heat loss, and control an external device based on the target ambient temperature to enable the external device to adjust an ambient temperature according to the target ambient temperature.

According to another aspect of the present disclosure, there is provided a method of controlling ambient temperature by using an electronic device, the method including: by a first temperature sensor, measuring a first temperature of body skin; by a second temperature sensor, measuring a second temperature at a position spaced apart from the body skin; estimating skin heat loss based on the first temperature and the second temperature; and determining a target ambient temperature based on the first temperature and the skin heat loss.

The estimating of the skin heat loss may include: calculating a skin heat flux by subtracting the second temperature from the first temperature; and estimating the skin heat loss based on the skin heat flux.

The determining of the target ambient temperature may include: estimating a thermal sensation score based on the first temperature and the skin heat loss; and determining the target ambient temperature based on the thermal sensation score.

The method may further include controlling an external device according to the target ambient temperature.

In another general aspect, there is provided an electronic device including: a communication interface configured to receive a first temperature of body skin and a second temperature at a position spaced apart from the body skin, the first temperature and the second temperature being measured by a temperature sensor; and a processor configured to estimate skin heat loss based on the first temperature and the second temperature, to determine a target ambient temperature for controlling an ambient temperature based on the first temperature and the skin heat loss, and to control an IoT device based on the determined target ambient temperature.

In yet another general aspect, there is provided an electronic device including: a temperature sensor configured to measure a body skin temperature; a heat flux sensor configured to measure skin heat flux; and a processor configured to estimate skin heat loss based on the skin heat flux, to determine a target ambient temperature for controlling an ambient temperature based on the body skin temperature and the skin heat loss, and to control an IoT device based on the determined target ambient temperature.

In still another general aspect, there is provided an electronic device including: a first temperature sensor configured to measure a first temperature of body skin; a second temperature sensor configured to measure a second temperature at a position spaced apart from the body skin; a processor configured to estimate skin heat loss based on the first temperature and the second temperature, and to calculate a thermal sensation score of a user based on the first temperature and the skin heat loss; and an output interface configured to output and provide the calculated thermal sensation score to the user.

In still another general aspect, there is provided an IoT device including: a sensor part configured to measure a body skin temperature and data related to skin heat flux; a processor configured to estimate skin heat loss based on the data related to skin heat flux, to estimate a thermal sensation score of a user based on the body skin temperature and the skin heat loss, and to set a target ambient temperature based on the estimated thermal sensation score; and a driver configured to control temperature according to the set target ambient temperature.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
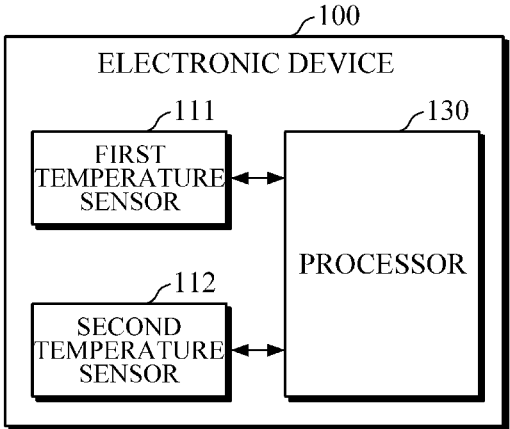
FIG. 1 is a block diagram illustrating an electronic device according to an embodiment of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

An electronic device according to various embodiments of the present disclosure which will be described below may include, for example, at least one of a wearable device, a smartphone, a tablet PC, a mobile phone, a video phone, an electronic book reader, a desktop computer, a laptop computer, a netbook computer, a workstation, a server, a personal digital assistant (PDA), a portable multimedia player (PMP), an MPEG audio Layer-3 (MP3) player, a medical device, and a camera. The wearable device may include at least one of an accessory type wearable device (e.g., wristwatch, ring, bracelet, anklet, necklace, glasses, contact lens, or head mounted device (HMD)), a textile/clothing type wearable device (e.g., electronic clothing), a body-mounted type wearable device (e.g., skin pad or tattoo), and a body implantable type wearable device. However, the wearable device is not limited thereto and may include, for example, various portable medical measuring devices (antioxidant measuring device, blood glucose monitor, heart rate monitor, blood pressure measuring device, thermometer, etc.), magnetic resonance angiography (MRA), magnetic resonance imaging (MRI), computed tomography (CT), imaging system, ultrasonic system, etc.), and the like. However, the electronic device is not limited to the above devices.

Figure 2:
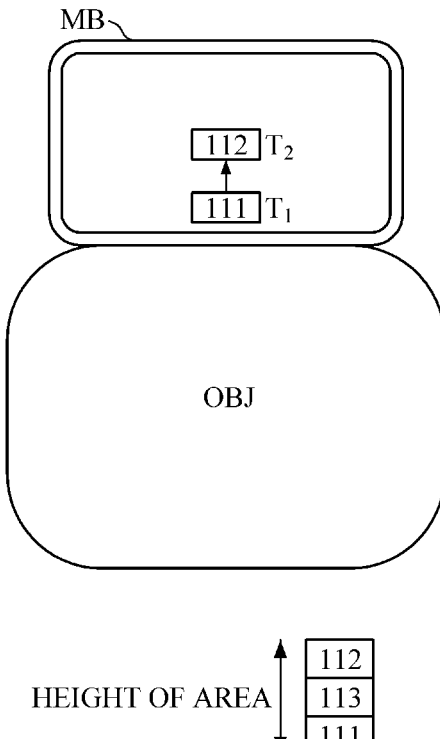
FIG. 2 is a diagram schematically illustrating the arrangement of sensors in the electronic device of FIG. 1.

FIG. 1 is a block diagram illustrating an electronic device according to an embodiment of the present disclosure. FIG. 2 is a diagram schematically illustrating the arrangement of sensors in the electronic device of FIG. 1.

Referring to FIG. 1, an electronic device 100 includes a first temperature sensor 111, a second temperature sensor 112, and a processor 130.

Referring to FIGS. 1 and 2, the first temperature sensor 111 may be disposed on a surface of a main body case MB which comes into contact with body OBJ (hereinafter referred to as a "first surface") or may be disposed at a position adjacent to the first surface in the main body case MB, and may measure a first temperature T1 of body skin during contact with the body OBJ of a user. In this case, a position of the body may be a surface of the wrist that is adjacent to the radial artery, an upper part of the wrist where venous blood or capillary blood passes, or a peripheral part of the body with high blood vessel density, such as fingers, toes, ears, and the like. However, the object is not limited thereto.

The second temperature sensor 112 may be disposed in the case MB at a position spaced apart from the first temperature sensor 111. As illustrated herein, the second temperature sensor 112 may be disposed relatively further away from the first surface of the case MB than the first temperature sensor 111, and may measure a second temperature T2 inside the main body case MB.

The first temperature sensor 111 and the second temperature sensor 112 may be attached to one or more structures (e.g., printed circuit board (PCB), battery, etc.) in the main body case MB. The first temperature sensor 111 and the second temperature sensor 112 may be disposed in a straight line (i.e., a thickness direction of the main body case MB when the electronic device 100 is implemented as a smartwatch), but the arrangement thereof is not limited thereto, and by changing the arrangement of structures, the first and second temperature sensors may be spaced apart at various positions. The first temperature sensor 111 may be disposed at a distance of 10 mm or less from the first surface of the main body case MB, and the second temperature sensor 112 may be disposed at a distance of 10 mm or less from the first temperature sensor 111. However, this is merely exemplary, and distances and positions in the arrangement of the first and second temperature sensors 111 and 112 may be changed variously depending on the size and shape of a form factor and the like.

A thermally conductive material 113 may be further disposed between the first temperature sensor 111 and the second temperature sensor 112, and/or between the second temperature sensor 112 and a surface opposite the first surface (hereinafter referred to as a "second surface"). The first temperature sensor 111, the second temperature sensor 112, and the thermally conductive material 113 may be formed in a stacked structure. The thermally conductive material 113 may be, for example, an insulator having a thickness of 0.1 mm to 50 mm, and may be a material (e.g., polyurethane foam or air) having a thermal conductivity of less than 0.1 W/mK. However, the size and thermal conductivity of the insulator are not limited thereto. Further, an air-filled structure may also be provided in which air having a low thermal conductivity is filled, without using a separate thermally conductive material 113.

Both the first temperature sensor 111 and the second temperature sensor 112 may be contact-type temperature sensors (e.g., thermistors), but are not limited thereto, and the first temperature sensor 111 may be a non-contact temperature sensor (e.g., an infrared temperature sensor), and the second temperature sensor 112 may be a contact-type temperature sensor (e.g., a thermistor).

The processor 130 may be connected to the first and second temperature sensors 111 and 112 to control the temperature sensors 111 and 112. The processor 130 may receive temperature data $T_1$ and $T_2$ from the temperature sensors 111 and 112, may determine a thermal sensation score corresponding to the temperature data $T_1$ and $T_2$, and may control an external device (e.g., a thermostat of a house) to adjust the ambient temperature based on the thermal sensation score.

Figure 3A:
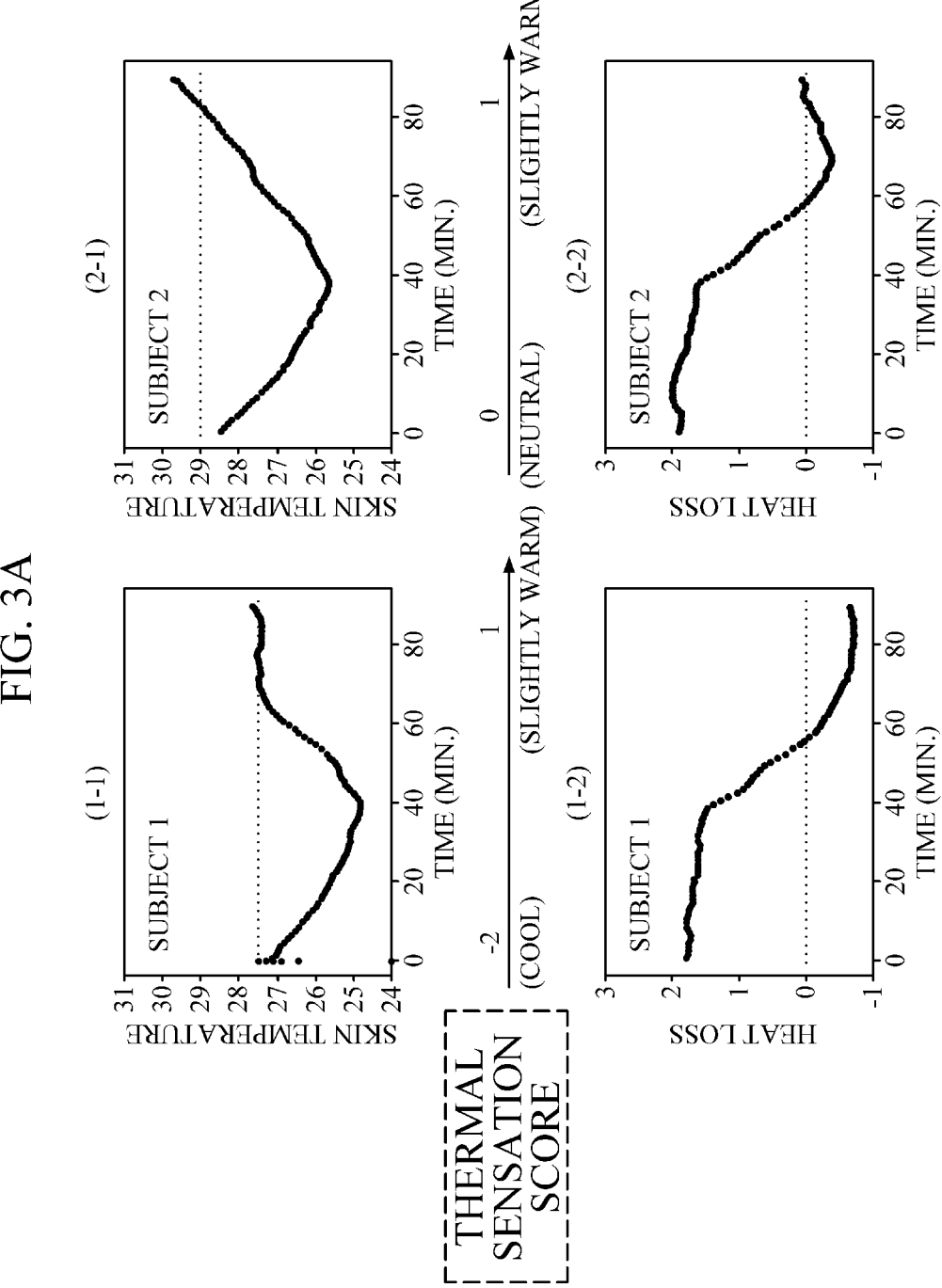
FIG. 3A is a diagram explaining a correlation of skin temperature and heat loss with thermal sensation scores.
Figure 3B:
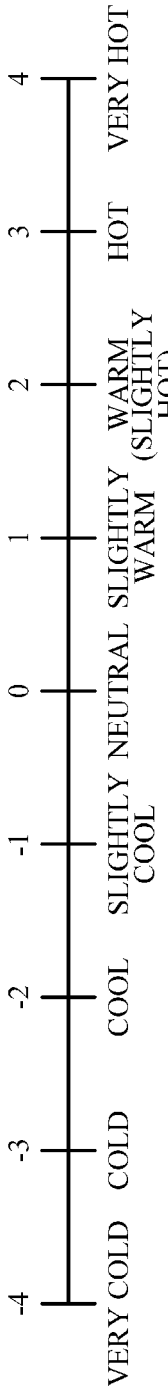
FIG. 3B is a diagram illustrating an example of thermal sensation scores.

FIG. 3A is a diagram explaining a correlation of skin temperature and heat loss with thermal sensation scores. FIG. 3B is a diagram illustrating an example of thermal sensation scores. As illustrated in FIG. 3B, the thermal sensation score may be a commonly used index or may be a pre-generated index personalized for each user.

Generally, when blood moves from the heart to the periphery, e.g., arteries in the wrist, skin heat loss occurs by radiation, convection, conduction, evaporation, and the like due to the effect of air temperature. In this case, the skin heat loss released from the center to the surface of the peripheral body part is proportional to the skin heat flux.

Referring to FIG. 3A, it can be seen that at similar skin temperatures, subjects feel cold when the heat loss is high and feel warm when the heat loss is low. Referring to graph (1-1), skin temperatures of a first subject at 0 and 80 minutes are similar at about 27.5 É, but the thermal sensation shows that the first subject feels cold at 0 min., and feels warm at 80 min. Referring to graph (1-2), it can be seen that the skin heat loss is approximately 2 at 0 min., and 0 or less at 80 min. In this case, the thermal sensation may be expressed as thermal sensation scores of "−2" and "1" at 0 and 80 minutes, respectively, as illustrated in FIG. 3B. Likewise, referring to graph (2-1), skin temperatures of a second subject at 0 and 80 minutes are similar at about 29 É, but the thermal sensation shows that the second subject feels neutral at 0 min., and feels warm at 80 min. Referring to graph (2-2), it can be seen that the skin heat loss is approximately 2 at 0 min., and about 0 at 80 min. In this case, the thermal sensation may be expressed as thermal sensation scores of "0" and "1" at 0 and 80 minutes, respectively. In this manner, it can be seen that a user's thermal sensation is related to the skin heat loss, in addition to the skin temperature.

The processor 130 may calculate skin heat flux $T_1-T_2$ by subtracting the second temperature $T_2$ from the first temperature $T_1$, and may estimate the skin heat loss based on the estimated heat flux. The skin heat flux may be proportional to the skin heat loss, such that the skin heat flux itself may be used as the skin heat loss value, or the skin heat loss may be obtained from the skin heat flux by using a predetermined linear or non-linear function that represents a correlation between the skin heat flux and the skin heat loss.

In one embodiment, upon obtaining the skin heat loss, the processor 130 may determine a target ambient temperature for controlling the ambient temperature by using the first temperature of the body skin, which is measured by the first temperature sensor 111, and the skin heat loss, and may control a target temperature of an Internet of Things (IoT) device according to the determined target ambient temperature. In this case, the IoT device may include an air-conditioner, bathtub, heating regulator (e.g., a thermostat), water purifier, refrigerator, illumination regulator, etc., but is not limited thereto.

For example, the processor 130 may predict the target ambient temperature by inputting the first temperature and the skin heat loss to a pre-defined target ambient temperature prediction model. The processor 130 may determine the predicted target ambient temperature to be the target ambient temperature for controlling the IoT device, or may compare the predicted target ambient temperature with a current ambient temperature, and may adaptively control the target ambient temperature based on the comparison. For example, if the predicted target ambient temperature is equal to the current ambient temperature, or if a difference therebetween is within a predetermined range, the processor 130 may determine the current ambient temperature to be the target ambient temperature. Alternatively, if the target ambient temperature is higher or lower than the current ambient temperature by a predetermined threshold or more, the processor 130 may increase or decrease the target ambient temperature by more than the predicted value, so that the current ambient temperature may rapidly reach the target ambient temperature.

In another example, upon obtaining the skin heat loss, the processor 130 may calculate a thermal sensation score by using the first temperature of the body skin, which is measured by the first temperature sensor 111, and the skin heat loss. In particular the processor 130 may calculate, for example, the thermal sensation score as illustrated in FIG. 3B, by inputting the first temperature and the skin heat loss to a thermal sensation score estimation model that defines a correlation of the skin temperature and the skin heat loss with the thermal sensation score.

The processor 130 may control the IoT device for regulating the ambient temperature based on the calculated thermal sensation score. By determining the target ambient temperature based on the thermal sensation score, the processor 130 may control the target ambient temperature of the IoT device according to the determined target ambient temperature.

For example, if the calculated thermal sensation score is lower than a target score, the processor 130 may increase the target ambient temperature; by contrast, if the calculated thermal sensation score exceeds the target score, the processor 130 may decrease the target ambient temperature; and if the calculated thermal sensation score is equal to the target score, the processor 130 may maintain the target ambient temperature. Referring to FIG. 3B, for example, a thermal sensation score of "0" for a "normal" thermal sensation may be set as a common target score. However, the target score is not limited thereto, and may be set as a target score personalized for each user. For example, for a user who prefers cool sensation, the target score may be set to "−1"; by contrast, for a user who prefers slightly warm sensation, the target score may be set to "1."

For example, the processor 130 may calculate a difference between the thermal sensation score and the target score, and may determine an increase or decrease in the target ambient temperature based on the calculated difference. For example, if a user's thermal sensation score is "−3" and a target score is "0," the processor 130 may increase the target ambient temperature by a level corresponding to the difference of 3; by contrast, if a user's thermal sensation score is "4" and a target score is "0," the processor 130 may decrease the target ambient temperature by a level corresponding to the difference of 4. In this case, the increase or decrease in the target ambient temperature may be obtained based on a difference between the thermal sensation score and the target score by using a linear/non-linear equation or a model such as a matching table, and the like.

In another example, the processor 130 may determine an increase or decrease in the target ambient temperature by considering a current ambient temperature of an IoT device to be controlled, and/or a difference between the thermal sensation score and the target score. For example, even when the calculated thermal sensation score is lower/higher than the target score, if the target ambient temperature or the current ambient temperature, after being increased or decreased, falls outside a reference range predefined for each user or each IoT device, the processor 130 may maintain the target ambient temperature as the current ambient temperature.

The above example of determining the target ambient temperature based on the first temperature and the skin heat loss and the example of estimating a user's thermal sensation score based on the first temperature and the skin heat loss and determining the target ambient temperature based on the thermal sensation score may be performed in parallel. For example, upon receiving the first temperature and the second temperature, the processor 130 may determine a first target ambient temperature based on the first temperature and the skin heat loss, may estimate a user's thermal sensation score based on the first temperature and the skin heat loss and determine a second target ambient temperature based on the thermal sensation score, and may determine a final target ambient temperature by combining the first target ambient temperature and the second target ambient temperature. For example, a method of combining the first target ambient temperature and the second target ambient temperature may include an arithmetic mean method or weighted average method (e.g., assigning a higher weight to the second target ambient temperature in which the thermal sensation score is considered), and the like, but is not limited thereto.

According to a setting, the processor 130 may perform only the operation of determining the target ambient temperature or calculating the thermal sensation score, and may selectively perform the controlling of the IoT device. The processor 130 may provide the determined target ambient temperature and/or the thermal sensation score to a user, thereby allowing the user to control the IoT device directly or via a remote control.

The aforementioned examples may be performed repeatedly while a user wears or carries the electronic device 100 on the body. For example, the first temperature sensor 111 and the second temperature sensor 112 may continuously estimate the first temperature and the second temperature from a user, and the processor 130 may continuously determine the target ambient temperature and control the IoT device at predetermined time intervals. However, the example of controlling the target ambient temperature is not limited to the continuous control of the target ambient temperature, and when a user wears or carries the electronic device 100 so that the first temperature sensor 111 and the second temperature sensor 112 comes into contact with the user's body, the processor 130 may control the target ambient temperature automatically or on-demand in response to the user's request.

Figure 4:
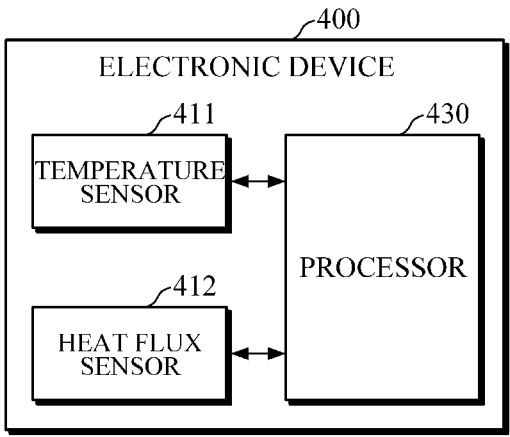
FIG. 4 is a block diagram illustrating an electronic device according to another embodiment of the present disclosure.
Figure 5:
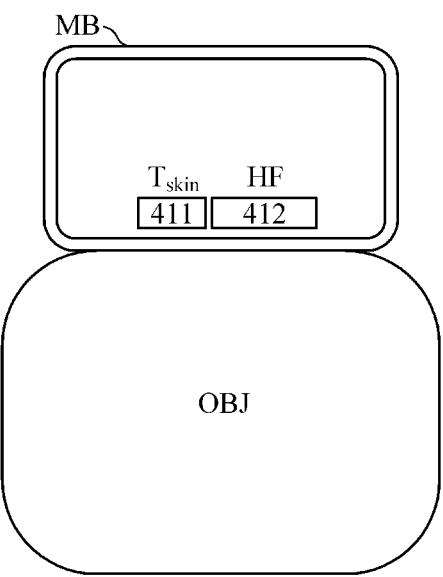
FIG. 5 is a diagram schematically illustrating the arrangement of sensors in the electronic device of FIG. 4.

FIG. 4 is a block diagram illustrating an electronic device according to another embodiment of the present disclosure. FIG. 5 is a diagram schematically illustrating the arrangement of sensors in the electronic device of FIG. 4.

Referring to FIG. 4, an electronic device 400 includes a temperature sensor 411, a heat flux sensor 412, and a processor 430.

Referring to FIGS. 4 and 5, the temperature sensor 411 may be disposed on a first surface of the main body case MB which comes into contact with a user's body OBJ or may be disposed at a position adjacent to the first surface in the case MB, and may measure a first temperature $T_{skin}$ of body skin during contact with the user's body OBJ. The temperature sensor 411 may be a contact-type temperature sensor, such as a thermistor, which is described above such that a detailed description thereof will be omitted.

The heat flux sensor 412 may be disposed on a first surface of the main body case MB which comes into contact with the body OBJ or may be disposed at a position adjacent to the first surface in the case MB, and may be spaced apart from a side surface of the temperature sensor 411. In this case, the heat flux sensor 412 may be a sensor for measuring skin heat flux by measuring a heat flow density, and may measure the skin heat flux HF at a position in contact with or adjacent to the body skin. The heat flux sensor 412 may have a volume of 1×1×0.5 mm 3 or less, but is not limited thereto.

The processor 130 may be connected to the temperature sensor 411 and the heat flux sensor 412 to receive the temperature data Tskin and the skin heat flux data HF, and may adjust the ambient temperature to a temperature customized to each user by using the received temperature data Tskin and skin heat flux data HF. By estimating the skin heat loss based on the skin heat flux measured by the heat flux sensor 412, the processor 130 may directly determine the target ambient temperature based on the temperature Tskin and the skin heat flux as described above, or by calculating the thermal sensation score, and then determining the target ambient temperature based on the calculated thermal sensation score, the processor 130 may control the IoT device based on the determined target ambient temperature, which is described above such that a detailed description thereof will be omitted.

Figure 6:
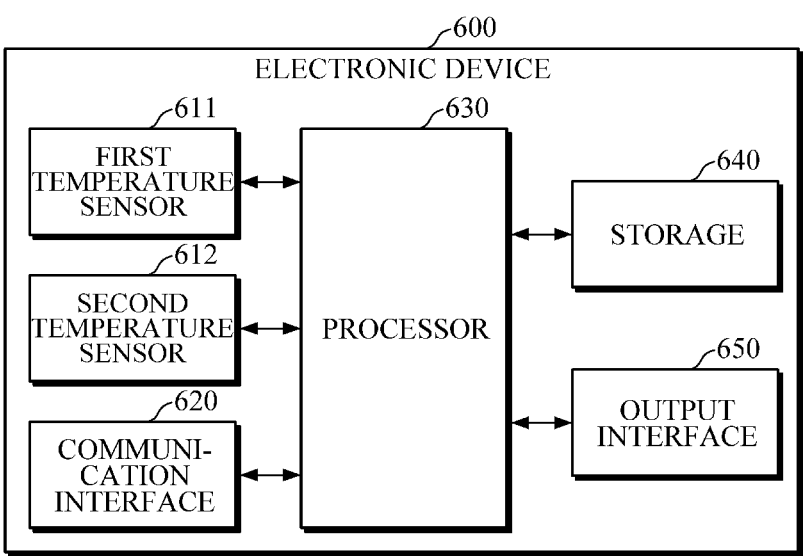
FIG. 6 is a block diagram illustrating an electronic device according to yet another embodiment of the present disclosure.
Figure 7A:
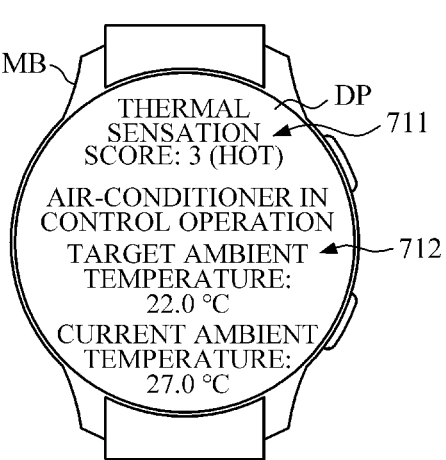
FIGS. 7A and 7B are diagrams illustrating an example of providing thermal sensation scores and information related to controlling ambient temperature in an electronic device.
Figure 7B:
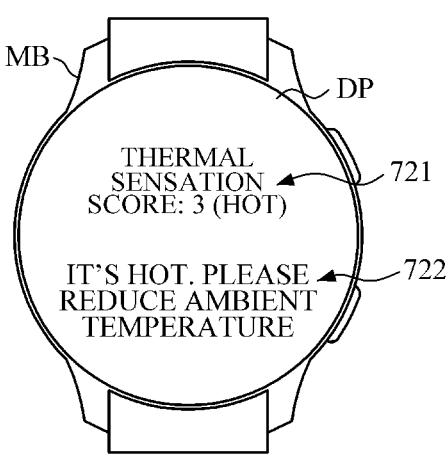

FIG. 6 is a block diagram illustrating an electronic device according to yet another embodiment of the present disclosure. FIGS. 7A and 7B are diagrams illustrating an example of providing information related to controlling ambient temperature in an electronic device.

Referring to FIG. 6, an electronic device 600 includes a first temperature sensor 611, a second temperature sensor 612, a communication interface 620, a processor 630, a storage 640, and an output interface 650. The first temperature sensor 611, the second temperature sensor 612, and the processor 630 are described above, and thus a detailed description thereof will be omitted. In this case, the second temperature sensor 612 may be replaced with the heat flux sensor 412 as in the embodiment of FIG. 4.

Once the processor 630 determines a target ambient temperature and generates a control signal for controlling a target temperature of an IoT device, the communication interface 620 may transmit the generated control signal to the IoT device. In addition, the communication interface 620 may receive current ambient temperature data from the IoT device, and may transmit the received data to the processor 630. Further, the communication interface 620 may transmit data processed by the processor 630, for example, a thermal sensation score, a target ambient temperature, a current ambient temperature data, etc., to an external device such as a smartphone and the like.

The communication interface 620 may communication with another electronic device by using various wired and wireless communication techniques including Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, Radio Frequency Identification (RFID) communication, 3G, 4G, and 5G communications, and the like. However, the communication techniques are not limited thereto.

The storage 640 may store various instructions, as well as a target ambient temperature prediction model, a thermal sensation score estimation model, data associated with an IoT device to be controlled, user reference data including a user's age, height, weight, exercise information, health information, and the like.

The storage 640 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The output interface 650 may output one or more of information processed by the electronic device 600, e.g., the first temperature, second temperature, heat flux, heat loss, target ambient temperature, thermal sensation score, current ambient temperature, and information on the IoT device being controlled, in a visual/non-visual manner by using a display, an audio output device, a haptic device, and the like.

For example, as illustrated in FIG. 7A, the output interface 650 may output a graphic object (e.g., text, image, etc.) indicating a thermal sensation score 711 and/or the IoT device being controlled, or information on a target ambient temperature and/or a current ambient temperature 712 to a display DP of the main body MB of the electronic device 600. However, the information is not limited thereto, and the output interface 650 may further provide information, such as the first temperature, second temperature, heat flux, heat loss, and the like. Alternatively, as illustrated in FIG. 7B, in the case where the processor 630 performs only the operation of calculating the thermal sensation score, the output interface 650 may output a thermal sensation score 721 to the display DP of the main body MB of the electronic device 600, and may output information 722 for guiding control of the ambient temperature based on the thermal sensation score. Alternatively, in the case where the processor 630 performs only the operation of determining the target ambient temperature, the output interface 650 may display the target ambient temperature and/or information for guiding control of the IoT device to the display DP of the main body MB of the electronic device 600, thereby allowing a user to control the IoT device directly or via a remote control.

Figure 8:
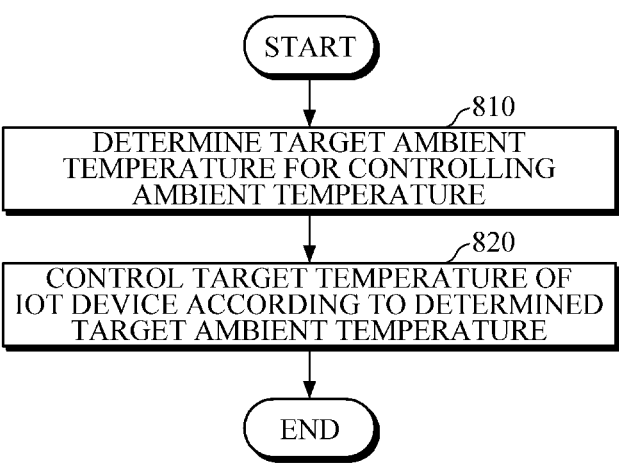
FIG. 8 is a flowchart illustrating a method of controlling ambient temperature according to an embodiment of the present disclosure.

FIG. 8 is a flowchart illustrating a method of controlling ambient temperature according to an embodiment of the present disclosure. The method of FIG. 8 is an example of a method of controlling ambient temperature performed by the electronic devices 100, 400, and 600 of FIG. 1, FIG. 4, or FIG. 6, which are described in detail above, and thus will be briefly described below.

First, the electronic device may determine a target ambient temperature for controlling ambient temperature in operation 810. The electronic device may receive data measured by two temperature sensors mounted therein, data measured by one temperature sensor and the heat flux sensor, or may receive temperature data, heat flux data, and the like from another electronic device, and may determine the target ambient temperature by using the received data.

Then, the electronic device may control a target temperature of an IoT device according to the determined target ambient temperature in 820. Operations 810 and 820 may be performed repeatedly until a current ambient temperature reaches the target ambient temperature.

Figure 9A:
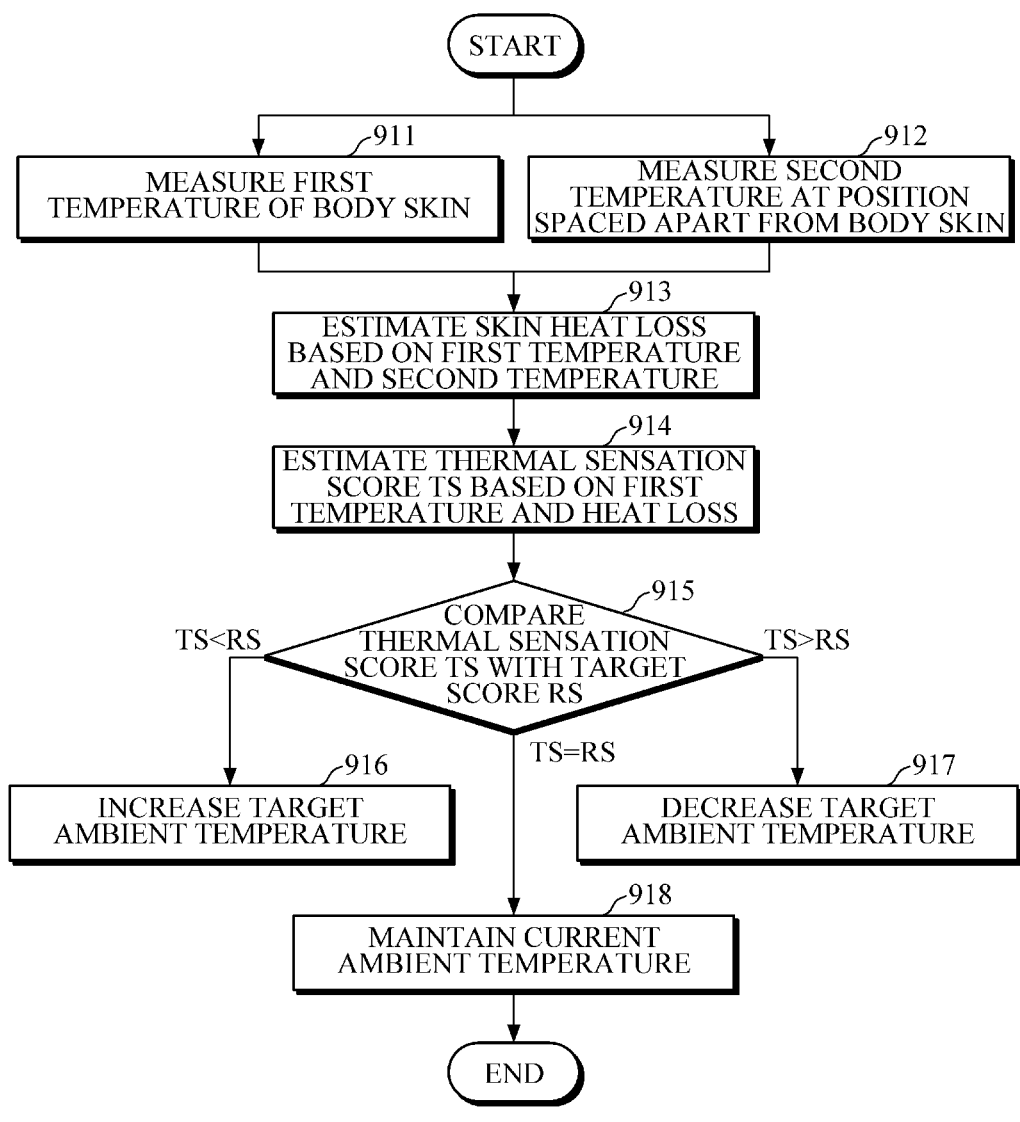
FIGS. 9A, 9B, and 9C are diagrams illustrating examples of an operation of determining a target ambient temperature of FIG. 8.
Figure 9B:
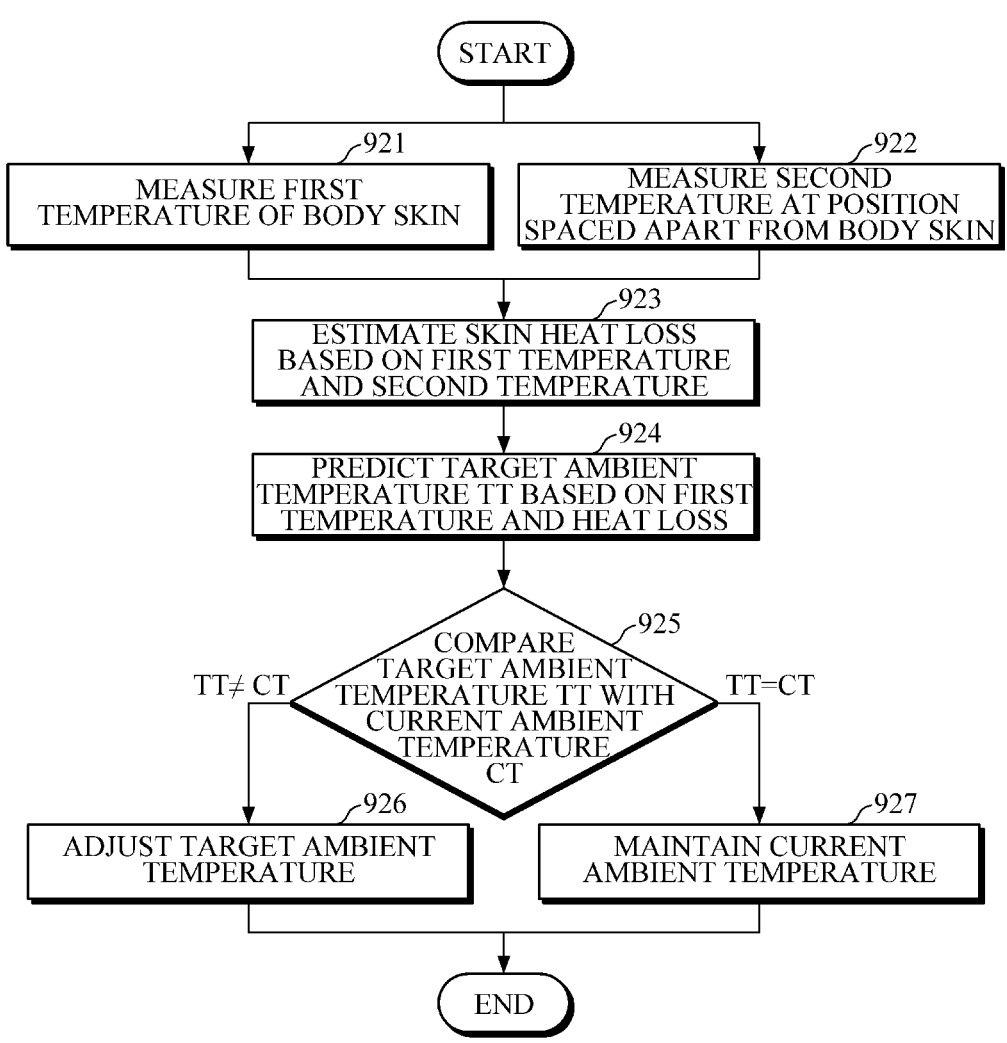
Figure 9C:
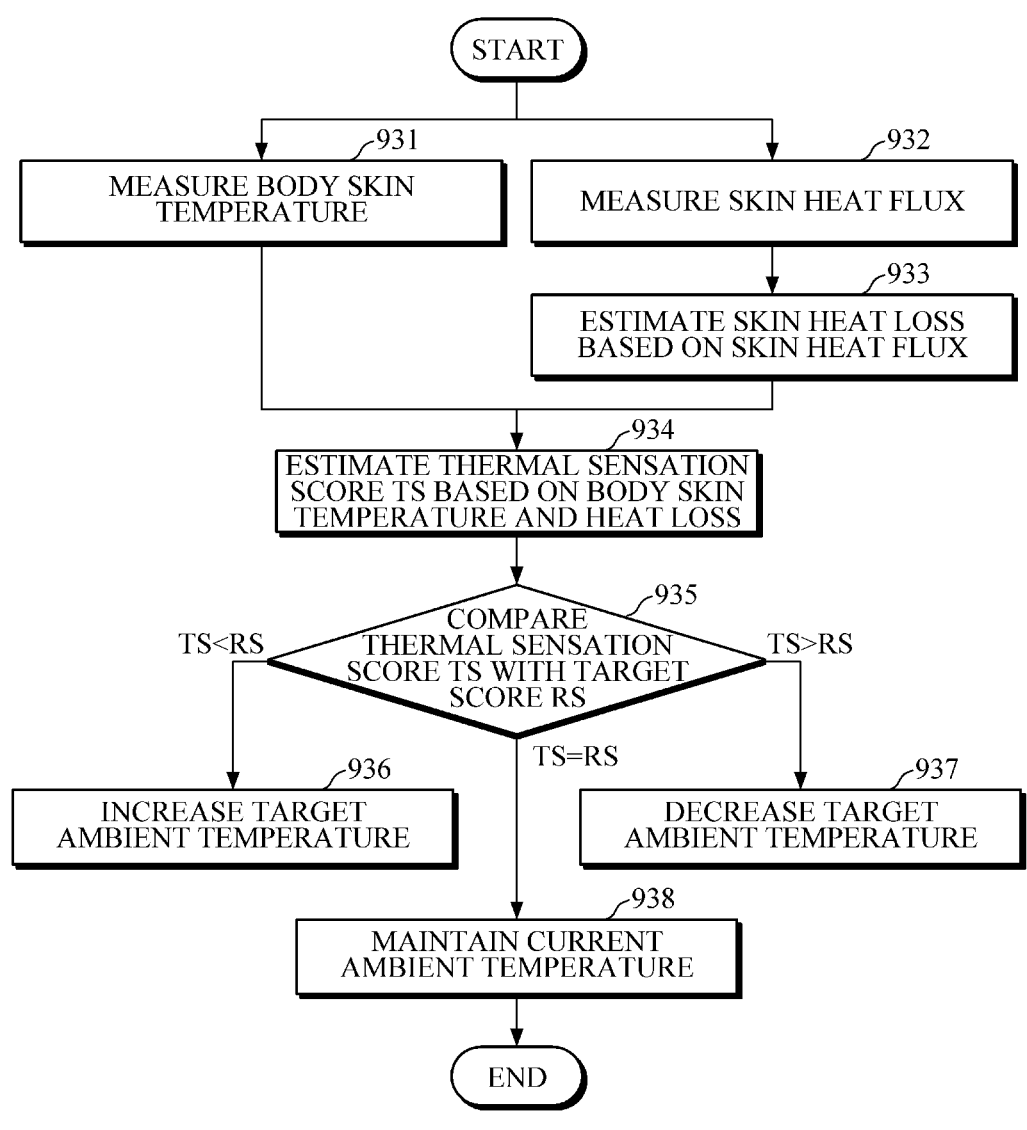

FIGS. 9A to 9C are diagrams illustrating examples of operation 810 of determining the target ambient temperature of FIG. 8, which is merely exemplary and the present disclosure is not limited to these examples.

Referring to FIG. 9A, by using the first temperature sensor disposed at a position adjacent to a surface of the main body case that comes into contact with a user's body, the electronic device may measure a first temperature of body skin during contact with the user's body in operation 911.

In addition, by using the second temperature sensor spaced apart from the first temperature sensor in the case, the electronic device may measure a second temperature at a position spaced apart from the body skin inside the main body case in operation 912.

Then, the electronic device may estimate skin heat loss based on the first temperature and the second temperature in operation 913. The electronic device may calculate skin heat flux $T_1-T_2$ by subtracting the second temperature $T_2$ from the first temperature $T_1$, and may estimate the skin heat loss based on the estimated heat flux.

Subsequently, the electronic device may estimate a thermal sensation score TS based on the first temperature and the heat loss in operation 914. The electronic device may calculate the thermal sensation score by inputting the first temperature and the skin heat loss to a thermal sensation score estimation model that defines a correlation of the skin temperature and the skin heat loss with the thermal sensation score.

Next, the electronic device may compare the thermal sensation score TS, estimated in operation 914, with a target score RS in operation 915. If the thermal sensation score TS is less than the target score RS, the electronic device may increase the target ambient temperature in operation 916; if the thermal sensation score TS is greater than the target score RS, the electronic device may decrease the target ambient temperature in operation 917; and if the thermal sensation score TS is equal to the target score RS, the electronic device may maintain the current ambient temperature in operation 918. In this case, an increase and decrease of the target ambient temperature may be pre-defined as a fixed value, or may be determined based on a difference between the thermal sensation score and the target score and/or the current ambient temperature.

Operations 911 to 918 may be performed continuously at predetermined time intervals while the user wears or carries the electronic device on the body.

Referring to FIG. 9B, by using the first temperature sensor disposed at a position adjacent to a surface of the main body case that comes into contact with a user's body, the electronic device may measure a first temperature of body skin during contact with the user's body in operation 921.

In addition, by using the second temperature sensor spaced apart from the first temperature sensor in the case, the electronic device may measure a second temperature at a position spaced apart from the body skin inside the main body case in operation 922.

Then, the electronic device may estimate skin heat loss based on the first temperature and the second temperature in operation 923. The electronic device may calculate skin heat flux $T_1-T_2$ by subtracting the second temperature $T_2$ from the first temperature $T_1$, and may estimate the skin heat loss based on the estimated heat flux.

Subsequently, the electronic device may predict a target ambient temperature TT based on the first temperature and the heat loss in operation 924. The electronic device may determine the target ambient temperature by inputting the first temperature and the skin heat loss to a target ambient temperature prediction model that defines a correlation of the skin temperature and the skin heat loss with the target ambient temperature.

Next, the electronic device may compare the target ambient temperature TT, determined in operation 924, with a current ambient temperature CT in operation 925. If the target ambient temperature TT is different from the current ambient temperature CT, the electronic device may adjust, in operation 926, the target ambient temperature predicted in operation 924; and if the target ambient temperature TT is equal to the current ambient temperature CT, the electronic device may determine the current ambient temperature to be the target ambient temperature, and may maintain the current ambient temperature in operation 927. In an embodiment of the disclosure, when the target ambient temperature TT is different from the current ambient temperature CT, if the difference therebetween is within a predetermined range, the electronic device may maintain the current ambient temperature to save energy. The target ambient temperature may be adjusted by various methods or levels.

Operations 921 to 927 may be performed continuously at predetermined time intervals while the user wears or carries the electronic device on the body.

Referring to FIG. 9C, by using the first temperature sensor disposed at a position adjacent to a surface of the main body case that comes into contact with a user's body, the electronic device may measure a body skin temperature during contact with the user's body in operation 931.

In addition, by using the heat flux sensor disposed on a side surface and spaced apart from the temperature sensor in the case, the electronic device may measure skin heat flux in operation 932.

Then, the electronic device may estimate skin heat loss in operation 933 based on the skin heat flux measured in operation 912.

Subsequently, the electronic device may estimate a thermal sensation score TS based on the body skin temperature and the heat loss in operation 934.

Next, the electronic device may compare a thermal sensation score TS with a target score RS in operation 935. If the thermal sensation score TS is smaller than the target score RS, the electronic device may increase the target ambient temperature in operation 936; if the thermal sensation score TS is greater than the target score RS, the electronic device may decrease the target ambient temperature in operation 937; and if the thermal sensation score TS is equal to the target score RS, the electronic device may maintain the current ambient temperature in operation 938. In an embodiment of the disclosure, when the thermal sensation score TS is different from the target score RS, if the difference between the thermal sensation score TS and the target score RS is within a predetermined range, the electronic device may maintain the current ambient temperature in order to save energy.

Operations 931 to 938 may be performed continuously at predetermined time intervals while the user wears or carries the electronic device on the body.

Figure 10:
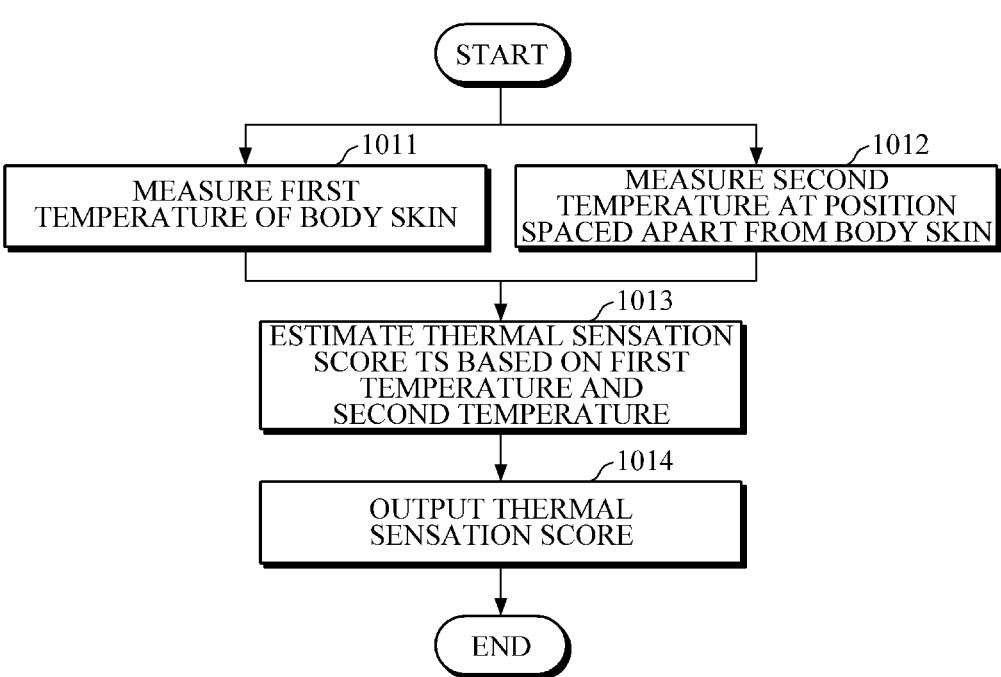
FIG. 10 is a flowchart illustrating a method of estimating a user's thermal sensation.

FIG. 10 is a flowchart illustrating a method of estimating a user's thermal sensation.

Referring to FIG. 10, by using the first temperature sensor disposed at a position adjacent to a surface of the main body case that comes into contact with a user's body, the electronic device may measure a first temperature of body skin during contact with the user's body in operation 1011.

In addition, by using the second temperature sensor spaced apart from the first temperature sensor in the case, the electronic device may measure a second temperature at a position spaced apart from the body skin inside main body case in operation 1012.

Then, the electronic device may estimate a thermal sensation score TS based on the first temperature and the second temperature in operation 1013. For example, the electronic device may estimate skin heat loss based on the first temperature and the second temperature in operation 1013. The electronic device may calculate skin heat flux $T_1-T_2$ by subtracting the second temperature $T_2$ from the first temperature $T_1$, and may estimate the skin heat loss based on the estimated heat flux. The electronic device may calculate the thermal sensation score by inputting the first temperature and the skin heat loss to a thermal sensation score estimation model that defines a correlation of the skin temperature and the skin heat loss with the thermal sensation score.

Next, the electronic device may output the thermal sensation score in operation 1014. By referring to the output thermal sensation score, a user may perform various actions, such as directly controlling an IoT device, and the like.

Figure 11:
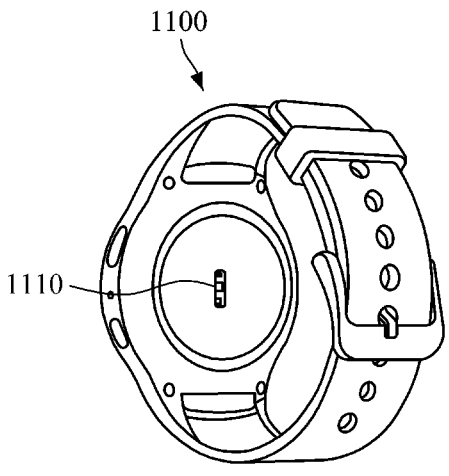
FIG. 11 is a diagram illustrating a wristwatch-type wearable device as an example of an electronic device.
Figure 12:
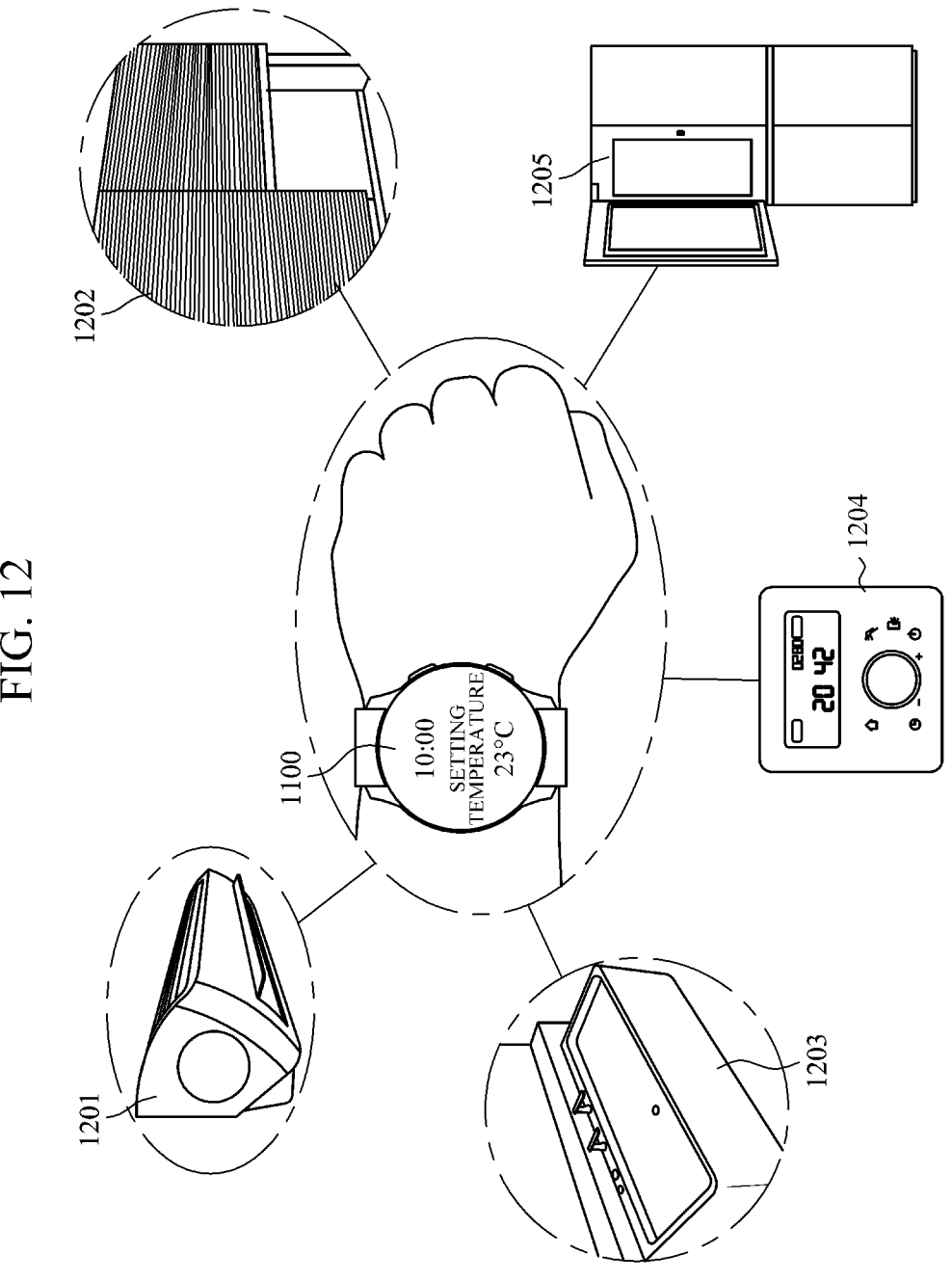
FIG. 12 is a diagram illustrating an example of controlling IoT devices by a wristwatch-type wearable device.

FIG. 11 is a diagram illustrating a wristwatch-type wearable device as an example of an electronic device. FIG. 12 is a diagram illustrating an example of controlling IoT devices by a wristwatch-type wearable device.

Referring to FIG. 11, a wristwatch-type wearable device 1100 includes a main body and a wrist strap. A display may be provided on a front surface of the main body, and may display various application screens including time information, received message information, IoT information, target ambient temperature information, and the like. A sensor device 1110 may be disposed on a rear surface of the main body. The sensor device 1110 may include a plurality of temperature sensors spaced apart at different distances from a wrist contact surface, or may include one temperature sensor and a heat flux sensor. In addition, the sensor device 1110 may include various other sensors, such as a photoplethysmography (PPG) sensor and the like. A processor, a communication interface, a storage, and various other components may be disposed in the main body case. Referring to FIG. 12, the wearable device 1100 may control an IoT device, e.g., a target temperature of an air-conditioner 1201, a target illumination level of an illumination device 1202, a water temperature of a bathtub 1203, heating of a heater (or a thermostat) 1204, a water temperature of a water purifier 1205, etc., in which case the wearable device 1100 may display information on the set ambient temperature information, information on an IoT device being controlled (e.g., IoT device image, current ambient temperature, etc.) on the display.

Figure 13:
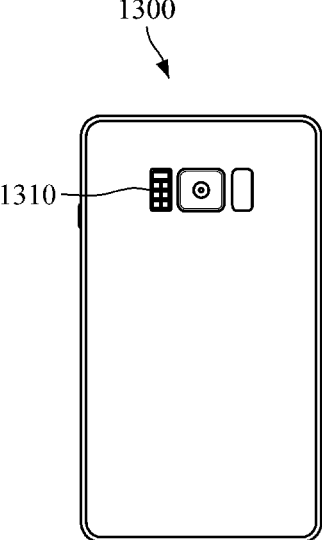
FIG. 13 is a diagram illustrating a smartphone as an example of an electronic device.

FIG. 13 is a diagram illustrating a smartphone as an example of an electronic device.

A mobile device 1300 may include a main body case and a display panel. The main body case may form an outer appearance of the mobile device 1300. The main body case has a front surface, on which the display panel and a cover glass may be disposed sequentially, and the display panel may be exposed to the outside through the cover glass. A sensor device 1310, a camera module and/or an infrared sensor, and the like may be disposed on a rear surface or a side surface of the main body. The sensor device 1310 may include a plurality of temperature sensors spaced apart at different distances from a contact surface with a body part (e.g., finger), or may include one temperature sensor and a heat flux sensor. A processor, a communication interface, a storage, and various other components may be disposed in the main body case. The mobile device 1300 may determine a target ambient temperature customized to each user, and may control the IoT device according to the determined target ambient temperature.

Figure 14:
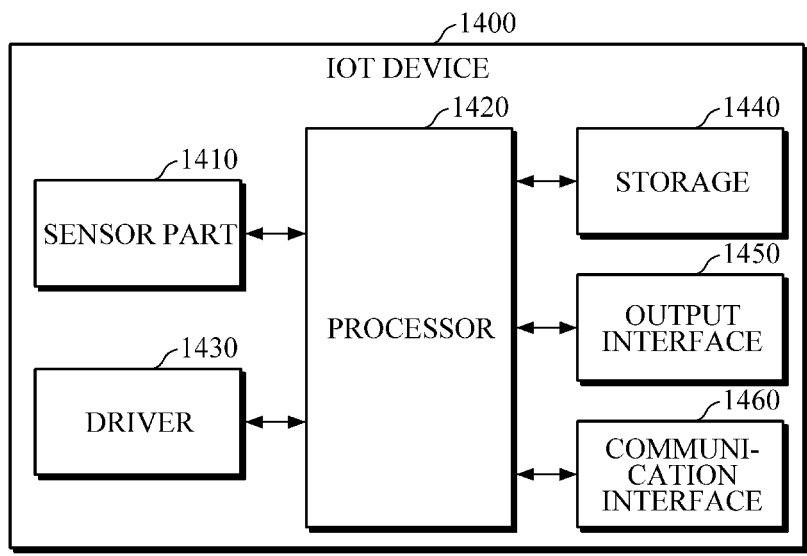
FIG. 14 is a block diagram illustrating an Internet of Things (IoT) device according to an embodiment of the present disclosure.

FIG. 14 is a block diagram illustrating an IoT device according to an embodiment of the present disclosure.

Examples of an IoT device 1400 may include an air-conditioner, a fan heater, an illumination device, a bathtub, a heater, a water purifier, a refrigerator, etc., but the IoT device 1400 is not limited thereto.

Referring to FIG. 14, the IoT device 1400 may include a sensor part 1410, a processor 1420, a driver (e.g., a driver circuit) 1430, a storage (e.g. a memory) 1440, an output interface 1450, and a communication interface 1460.

The sensor part 1410 may measure a body skin temperature and data related to skin heat flux when a user's body comes into contact with a body contact surface formed at the IoT device 1400. For example, the sensor part 1410 may include a first temperature sensor disposed at a position adjacent to the body contact surface and configured to measure a body skin temperature, and a second temperature sensor disposed at a position further away from the body contact surface than the first temperature sensor and configured to measure a temperature inside the main body for measuring the skin heat flux. Alternatively, the sensor part 1410 may include a temperature sensor disposed at a position adjacent to the body contact surface and configured to measure the body skin temperature, and a heat flux sensor disposed on a side surface of the temperature sensor and adjacent to the body contact surface, and configured to measure the heat flux. In addition, the sensor part 1410 may further include a separate temperature sensor for measuring a current ambient temperature, and other sensors for performing various functions of the IoT device 1400. The components of the sensor part 1410 may be mounted at one or more distributed positions in the main body of the device 1400. For example, the temperature sensor, the heat flux sensor, and the like for estimating the target ambient temperature may be disposed at a position (e.g., handle of a refrigerator, etc.) that facilitates contact with a user's body.

By estimating skin heat loss based on the body skin temperature, the temperature inside the main body, or the skin heat flux which are measured by the sensor part 1410 as described above, the processor 1420 may set a target ambient temperature based on the body skin temperature acid the skin heat loss, or upon calculating a thermal sensation score, the processor 1420 may set the target ambient temperature based on the calculated thermal sensation score.

Based on the target ambient temperature set by the processor 1420, or based on target ambient temperature received from another electronic device through the communication interlace 1460, the driver 1430 may drive a heating/cooling device installed in the IoT device 1400 or an illumination regulator and the like, to control the ambient temperature.

The storage 1440 may store various instructions for performing functions of the IoT device 1400, and; or data such as the target score, target ambient temperature prediction model, thermal sensation score estimation model, user information, etc., and may store data venerated and processed by the device 1400.

By using a display, an audio output device, and the like which are disposed in the main body of the IoT device 1400, the output interface 1450 may output not only information related to controlling the ambient temperature, but also other basic information provided by the IoT device 1400.

The communication interface 1460 may receive a control signal, including target ambient temperature data, from an electronic device such as a smart watch and the like. In addition, the communication interface 1460 may transmit current ambient temperature data to the electronic device.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
a first temperature sensor configured to measure a first temperature of body skin;
a second temperature sensor configured to measure a second temperature at a position spaced apart from the body skin; and
at least one processor configured to:
estimate a skin heat loss based on the first temperature and the second temperature;

estimate a thermal sensation score of a user by inputting the first temperature and the skin heat loss to a thermal sensation score estimation model, the thermal sensation score being an integer;
determine a target ambient temperature based on the first temperature, the skin heat loss, and the thermal sensation score; and
control an ambient temperature based on the determined target ambient temperature,
wherein in response to the thermal sensation score being lower than a target score, the at least one processor is further configured to increase the target ambient temperature, and
wherein in response to the thermal sensation score exceeding the target score, the at least one processor is further configured to decrease the target ambient temperature.

2. The electronic device of claim 1, wherein at least one of the first temperature sensor and the second temperature sensor is a thermistor.

3. The electronic device of claim 1, wherein the at least one processor is further configured to:
calculate skin heat flux by subtracting the second temperature from the first temperature; and
estimate the skin heat loss based on the skin heat flux.

4. The electronic device of claim 1, wherein the at least one processor is further configured to predict the target ambient temperature by inputting the first temperature and the skin heat loss to a predefined target ambient temperature prediction model.

5. The electronic device of claim 4, wherein the at least one processor is further configured to compare the predicted target ambient temperature with a current ambient temperature, and control the target ambient temperature based on a result of comparing the predicted target ambient temperature with the current ambient temperature.

6. The electronic device of claim 1, wherein the at least one processor is further configured to:
calculate a difference between the thermal sensation score and the target score, and
determine an increase or decrease in the target ambient temperature in proportion to the calculated difference.

7. The electronic device of claim 1, wherein the at least one processor is further configured to control a target temperature of an external device according to the target ambient temperature.

8. The electronic device of claim 1, wherein the first temperature sensor and the second temperature sensor are configured to continuously estimate the first temperature and the second temperature, respectively,
wherein based on the continuously estimated first temperature and the continuously estimated second temperature, the at least one processor is further configured repeatedly control an external device until a current ambient temperature reaches the target ambient temperature.

9. The electronic device of claim 1, further comprising a display configure to output at least one of the first temperature, the second temperature, a heat flux, the skin heat loss, the thermal sensation score of the user, the target ambient temperature, and a current ambient temperature.

10. The electronic device of claim 9, further comprising a communication interface configured to transmit a control signal for controlling a target temperature of an external device, and to receive the current ambient temperature from the external device.

11. An electronic device comprising:

a communication interface configured to receive a first temperature of body skin and a second temperature at a position spaced apart from the body skin, the first temperature and the second temperature being measured by a temperature sensor; and a processor configured to estimate skin heat loss based on the first temperature and the second temperature, estimate a thermal sensation score of a user by inputting the first temperature and the skin heat loss to a thermal sensation score estimation model, the thermal sensation score being an integer, to determine a target ambient temperature for controlling an ambient temperature based on the first temperature, the skin heat loss, and the thermal sensation score, and to control an IoT device based on the determined target ambient temperature, wherein in response to the thermal sensation score being lower than a target score, the at least one processor is further configured to increase the target ambient temperature, and wherein in response to the thermal sensation score exceeding the target score, the at least one processor is further configured to decrease the target ambient temperature.

12. An electronic device comprising:

a temperature sensor configured to measure a body skin temperature;

a heat flux sensor configured to measure skin heat flux; and a processor configured to estimate skin heat loss based on the skin heat flux, to estimate a thermal sensation score of a user based on the body skin temperature and the skin heat loss, the thermal sensation score being an integer, to determine a target ambient temperature for controlling an ambient temperature based on the body skin temperature and the skin heat loss, and to control an IoT device based on the determined target ambient temperature, wherein in response to the thermal sensation score being lower than a target score, the at least one processor is further configured to increase the target ambient temperature, and wherein in response to the thermal sensation score exceeding the target score, the at least one processor is further configured to decrease the target ambient temperature.

13. An electronic device comprising:

a first temperature sensor configured to measure a first temperature of body skin;

a second temperature sensor configured to measure a second temperature at a position spaced apart from the body skin;

a processor configured to:

estimate skin heat loss based on the first temperature and the second temperature;

calculate a thermal sensation score of a user based on the first temperature and the skin heat loss, the thermal sensation score being an integer;

determine a target ambient temperature based on the thermal sensation score; and control an ambient temperature based on the target ambient temperature; and an output interface configured to output and provide the calculated thermal sensation score to the user, wherein in response to the thermal sensation score being lower than a target score, the at least one processor is further configured to increase the target ambient temperature, and wherein in response to the thermal sensation score exceeding the target score, the at least one processor is further configured to decrease the target ambient temperature.

14. A method of controlling ambient temperature by using an electronic device, the method comprising:

by a first temperature sensor, measuring a first temperature of body skin;

by a second temperature sensor, measuring a second temperature at a position spaced apart from the body skin;

estimating skin heat loss based on the first temperature and the second temperature;

estimating a thermal sensation score of a user by inputting the first temperature and the skin heat loss to a thermal sensation score estimation model, the thermal sensation score being an integer;

determining a target ambient temperature based on the first temperature, the skin heat loss, and the thermal sensation score; and controlling an ambient temperature based on the determined target ambient temperature, wherein in response to the thermal sensation score being lower than a target score, increasing the target ambient temperature, and wherein in response to the thermal sensation score exceeding the target score, decreasing the target ambient temperature.

15. The method of claim 14, wherein the estimating of the skin heat loss comprises calculating skin heat flux by subtracting the second temperature from the first temperature, and estimating the skin heat loss based on the skin heat flux.

16. The method of claim 14, further comprising controlling an IoT device according to the target ambient temperature.

17. An IoT device comprising:

a sensor part configured to measure a body skin temperature and data related to skin heat flux;

a processor configured to estimate skin heat loss based on the data related to the skin heat flux, to estimate a thermal sensation score of a user based on the body skin temperature and the skin heat loss, the thermal sensation score being an integer, and to set a target ambient temperature based on the estimated thermal sensation score; and a driver configured to control temperature according to the set target ambient temperature, wherein in response to the estimated thermal sensation score being lower than a target score, the at least one processor is further configured to increase the target ambient temperature, and wherein in response to the estimated thermal sensation score exceeding the target score, the at least one processor is further configured to decrease the target ambient temperature.

* * * * *